United States Patent [19]

Collins

[11] 4,039,641
[45] Aug. 2, 1977

[54] PLASTICS CONTAINER MANUFACTURE

[75] Inventor: Thomas Robert Stephen Collins, Letchworth, England

[73] Assignee: Imperial Chemical Industries Limited, London, England

[21] Appl. No.: 636,295

[22] Filed: Nov. 28, 1975

[30] Foreign Application Priority Data

Dec. 3, 1974 United Kingdom ............... 52230/74

[51] Int. Cl.² ............................................. B29C 17/07
[52] U.S. Cl. ...................................... 264/28; 264/89; 264/96; 425/231
[58] Field of Search ....................... 264/89, 90, 92, 94, 264/96-99, 235, 346, 28; 425/DIG. 207, DIG. 208, DIG. 216; 53/29, 30 R, 140

[56] References Cited

U.S. PATENT DOCUMENTS

| 3,496,143 | 2/1970 | Siggel et al. | 264/92 X |
| 3,792,144 | 2/1974 | Burkett et al. | 264/98 X |
| 3,803,275 | 4/1974 | Corsover | 264/98 X |
| 3,821,349 | 6/1974 | Mozer | 264/99 X |
| 3,822,332 | 7/1974 | Hrach et al. | 264/97 |
| 3,849,530 | 11/1974 | Wyeth et al. | 264/98 X |
| 3,910,746 | 10/1975 | Mrusek et al. | 425/DIG. 208 |
| 3,966,378 | 6/1976 | Valyi | 264/94 X |

Primary Examiner—Jan H. Silbaugh
Attorney, Agent, or Firm—Cushman, Darby & Cushman

[57] ABSTRACT

An oriented plastics container, e.g. bottle, is heat set by holding an unheat set container against the heated walls of a split mould by means of gas under pressure, and thereafter cooling the container, e.g. by cooling the mould or by displacing said gas with a cooling liquid under pressure, and then removing the container from the mould. The liquid may be that to be packaged in the container.

4 Claims, 6 Drawing Figures

PLASTICS CONTAINER MANUFACTURE

This invention relates to plastics container manufacture and in particular to the manufacture of containers from orientable crystallisable plastics materials.

Containers, for example bottles, have heretofore been made from synthetic organic thermoplastic polymeric materials herein termed "plastics materials". Containers made from plastics materials have advantages over glass containers such as less weight, less noisy handling and better impact strength. It is desirable to use as small a weight of the plastics material as is possible.

Where it is desired to package liquids under pressure, e.g. carbonated drinks and beer, in such containers it is necessary that the container has sufficient strength to contain the liquid without undue expansion of the container over a period of time, as may be encountered upon normal storage. Thus the container should exhibit low creep. In order to minimise creep yet retain a low weight, it is desirable to utilise an oriented plastics material as orientation markedly increases the strength.

However it is often desirable to submit the containers to elevated temperatures, e.g. in pasteurising and sterilising operations and under such conditions the container may shrink causing distortion and the orientation, and hence strength, may be lost. This can be overcome by using an orientable crystallisable plastics material and, after imparting the desired orientation, heating the container, while restraining it from shrinkage, to induce crystallisation. Such a step is known as heat setting.

Crystallisable orientable organic synthetic thermoplastic polymeric materials that are particularly suited to container manufacture include high density polyethylene, propylene homopolymers and copolymers with minor amounts (less than 20% by weight) of comonomers such as ethylene, and polyesters such as polyethylene terephthalate or polybutylene terephthalate and copolyesters such as ethylene terephthalate/isophthalate copolymers.

It is a further requirement that the heat setting be performed quickly so that the containers may be made at an economic rate.

One difficulty in such a heat setting process is that the container needs to be restrained from shrinking while it is heated to the temperature at which crystallisation takes place and also while it is subsequently cooled. We have devised a process wherein these requirements may be met.

Accordingly we provide a process for the heat setting of containers made from an oriented crystallisable organic synthetic thermoplastic polymeric material comprising forcing an unheat set, oriented, container made from said polymeric material against the walls of a split mould heated to an elevated temperature at which the polymeric material crystallises by means of gas under pressure applied to the interior of the container, cooling the container, while maintaining sufficient pressure to keep the container in contact with the mould walls and then removing the container from the mould.

The container, which is preferably a bottle, may be separately formed and fed on a support to the heated split mould. However in a preferred embodiment the container may be blow moulded and heat set in a single operation. Thus a parison of the plastics material, having one closed end and being preheated to a temperature at which it can be blow moulded, supported on a mandrel, may be fed to a heated split blow mould. The parison is gripped at its base and axially stretched by means of a plunger located in the mandrel which plunger is forced, e.g. by gas under pressure, against the closed end of the parison. The parison is also expanded radially against the walls of the split mould by gas pressure. The gas pressure can then be maintained to restrain shrinkage during heat setting.

The heat setting temperature employed will depend on the plastics material utilised. Normal heat setting temperatures, e.g. as encountered in heat setting of oriented films or fibres made from the plastics material may be used. For polyethylene terephthalate the mould is preferably maintained at 130° to 220° C, preferably 135° to 210° C.

The cooling of the container may be achieved by cooling the mould down to a mould temperature, e.g. to below about 60° C for polyethylene terephthalate, at which the container can be removed therefrom without sticking to the mould surface. The pressure can then be released and the bottle removed from the mould. Alternatively the container may be cooled by displacing the pressurising gas, while maintaining the pressure, with a cooling liquid under pressure and then removing the container containing said liquid from the mould.

The cooling liquid is the liquid to be packaged in the container. Preferably the liquid is chilled, e.g. to about 0° to 5° C so that it rapidly quenches the plastic adjacent the mould walls.

It will be appreciated that the container should not be left too long in the mould after displacement of the gas with the cooling liquid as the latter would then become unduly heated. Thus preferably the mould should be opened as soon as the container has been filled with the liquid.

The pressure can be released when opening the mould or, if desired, the container can be sealed with the liquid under pressure.

One embodiment of the invention is illustrated by reference to the accompanying drawings wherein FIG. 1 is a diagrammatic cross-section through a blow mould showing a parison located on a mandrel clamped in the mould.

Figure 3:
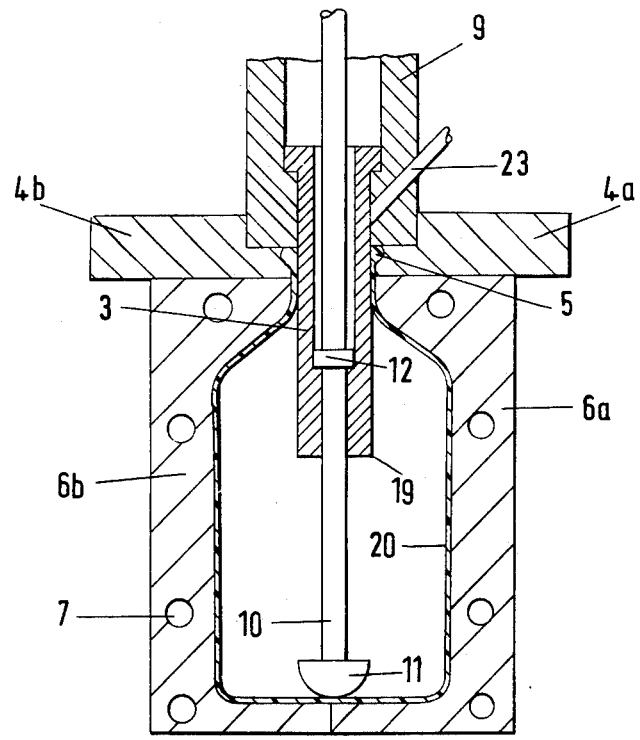
Figure 5:
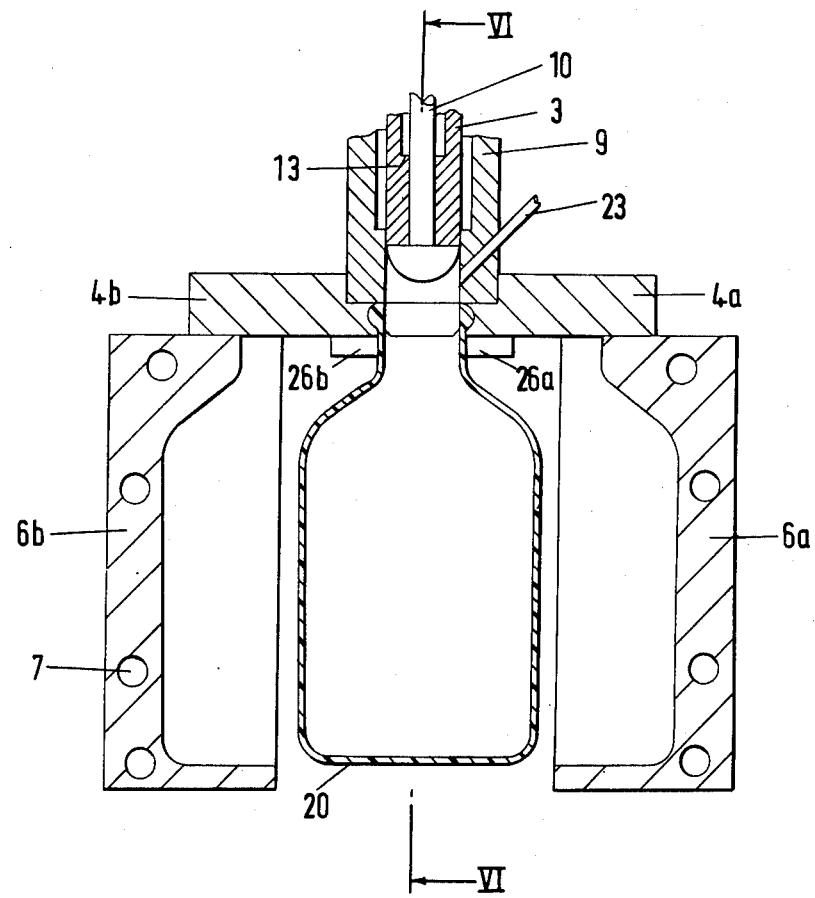
Figure 6:
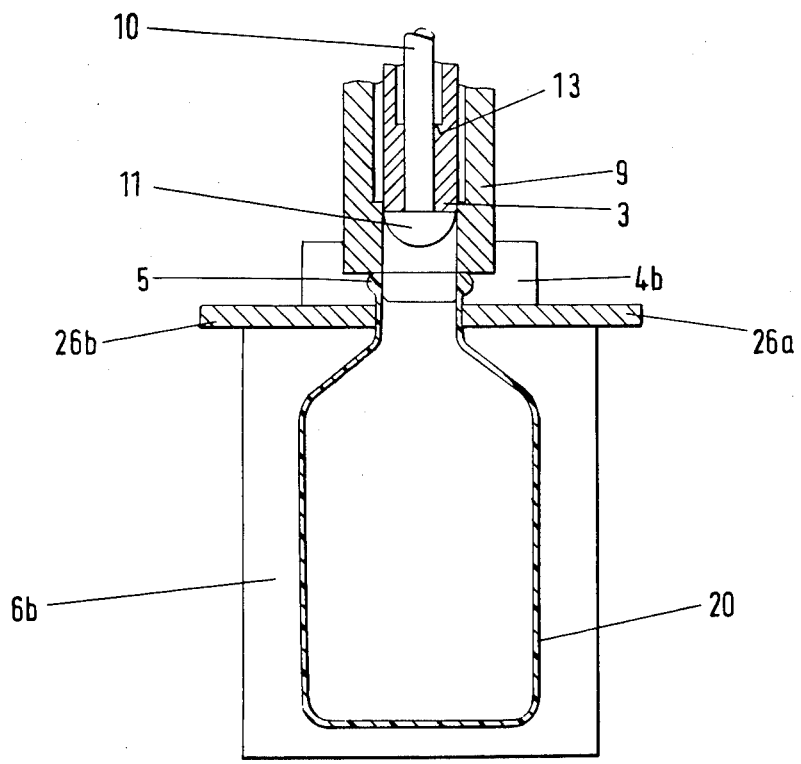
FIG. 6 is a section along the line VI—VI of FIG. 5.

In FIGS. 3, 5 and 6 only the lower part of the assembly is shown. In the Figures, the valves are shown schematically.

Figure 1:
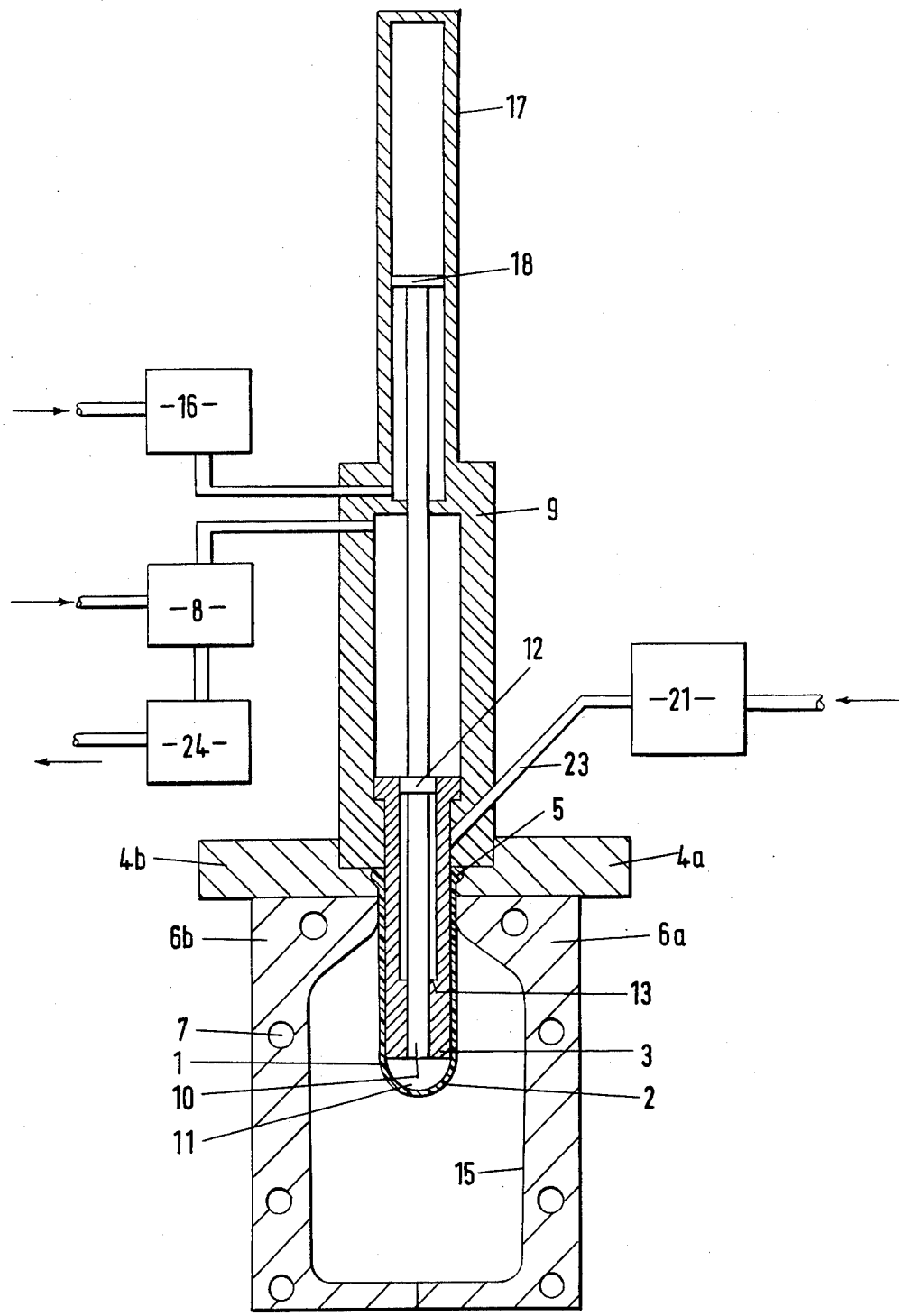

In FIG. 1 there is shown a parison 1 of polyethylene terephthalate preheated to 95° C and having one closed end 2 mounted on a mandrel 3. The parison is clamped adjacent its open end against the mandrel 3 by a pair of clamping plates 4a,4b which are shaped to provide a lip 5 to the parison 1. Round the remainder of the parison 1 are provided a pair of mould members 6a,6b of a split mould heated to 200° C by oil circulating in channels 7 in mould members 6a,6b.

Figure 2:
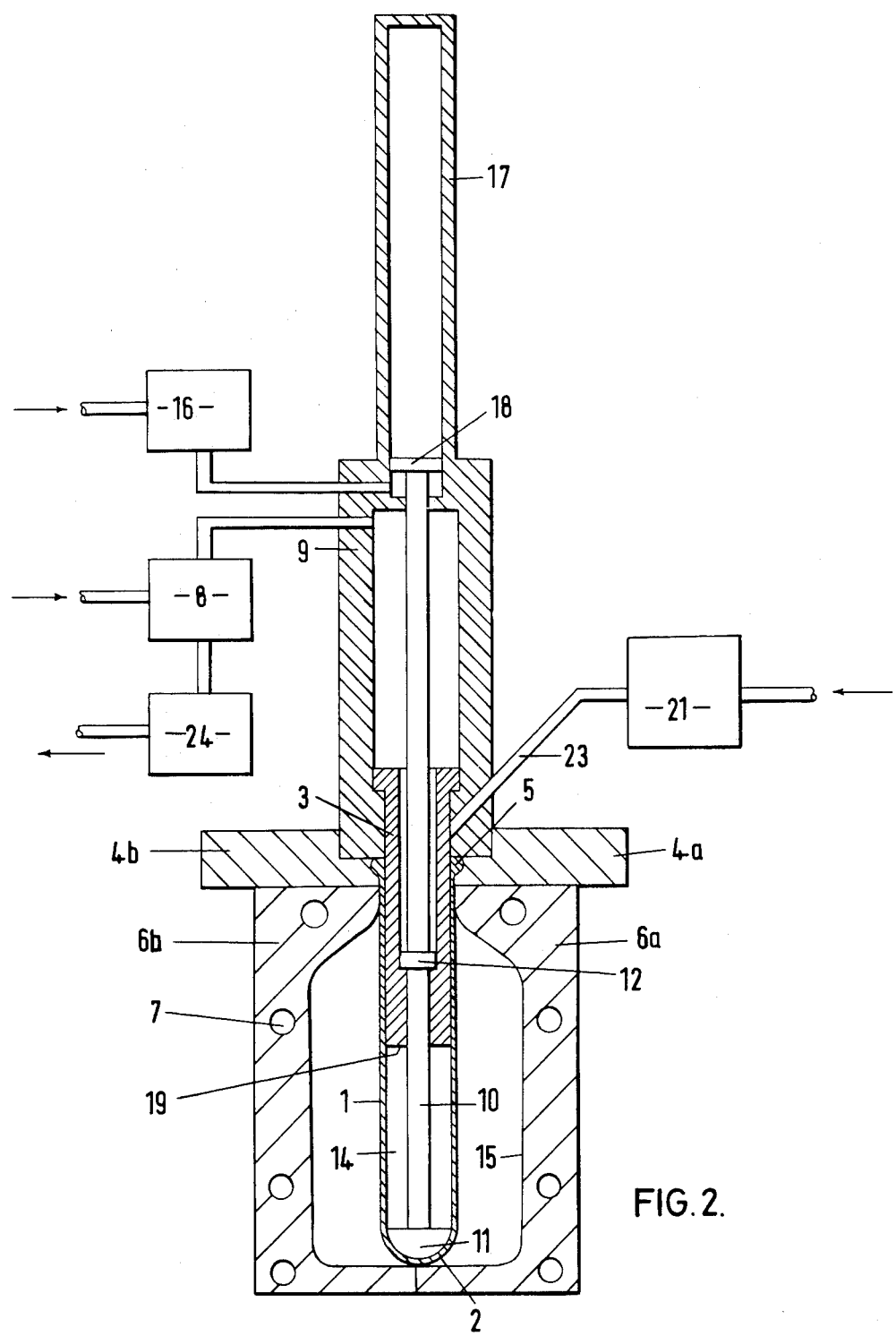
FIGS. 2 to 5 are views similar to FIG. 1 showing successive stages in the process.
Figure 4:
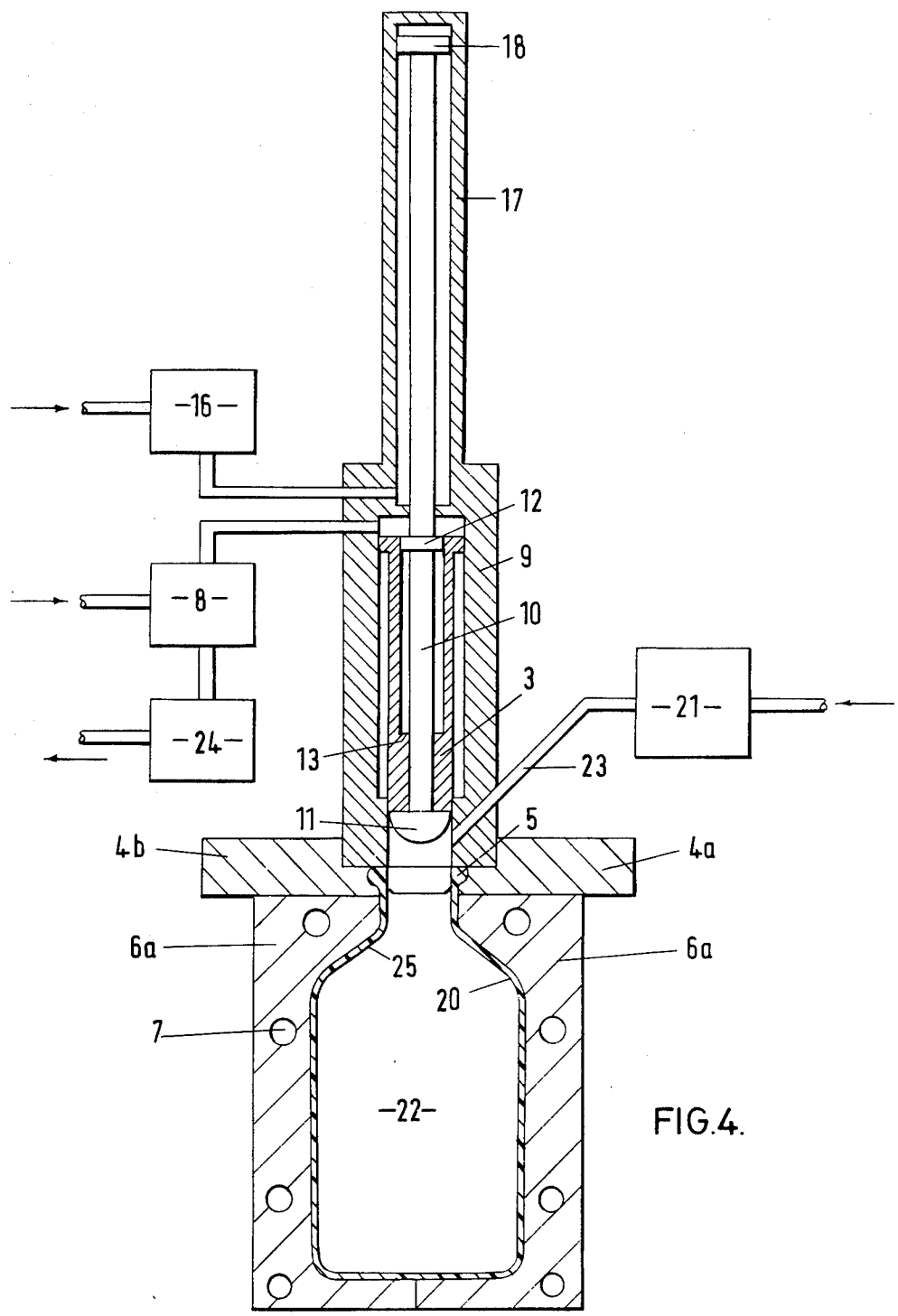

As shown in FIG. 2 the parison is then axially stretched by applying compressed carbon dioxide gas, via a valve 8, to a cylinder 9 in which the mandrel 3 is slidably mounted, whereupon a plunger 10, slidably mounted in mandrel 3, is forced to extend out of mandrel 3. Plunger 10 has a domed end 11 threaded thereto which engages with the closed end 2 of parison 1. Movement of plunger 10 thus causes the parison 1 to stretch and hence orient in the longitudinal direction. The extremity of movement of plunger 10 is determined by a collar 12 on plunger 10 engaging with a rebate 13 in mandrel 3. The carbon dioxide gas also leaks past the plunger 10 via flats (not shown) machined along the length of the plunger 10, into the space 14 inside parison 1 and causes the longitudinally stretched parison to expand and orient radially to the confines of the cavity 15 defined by the mould members 6a,6b as shown in FIG. 3. Actuation of valve 8 to commence application of the gas to mandrel 3 also starts a timer (not shown). After a predetermined period, during which the longitudinal and radial stretching takes place, the timer operates a valve 16 to supply compressed gas to a cylinder 17 mounted above cylinder 9. A piston 18, slidably mounted in cylinder 17 and fastened to plunger 10, thus causes the plunger to retract with respect to mandrel 3. [To avoid complicating the drawings, cylinders 9 and 17 have been shown as an integral structure. However it will be appreciated that in order to assemble the apparatus, they should be separate and assembled after inserting the mandrel 3 in cylinder 9 and plunger 10 in mandrel 3 and cylinder 17.] Upon engagement of the domed end 11 of plunger 10 with the end 19 of mandrel 3, further movement of piston 18 with respect to cylinder 17 causes the mandrel 3 to slide with respect to cylinder 9. The plunger 10 and mandrel 3 are thus retracted, while still maintaining the gas pressure inside the blown container 20 (see FIG. 4). The timer then actuates a valve 21 to supply a carbonated liquid, e.g. beer, chilled to 1° C, under pressure, to the interior 22 of the container 20 via a supply pipe 23 and also switches valve 8 to permit the carbon dioxide in the interior 22 of container 20 to escape via vents (not shown) machined in on the domed end 11 of plunger 10 and thence via the flats on plunger 10, back through mandrel 3 and cylinder 9 via a pressure relief valve 24. This valve 24 thus enables the pressure to be maintained inside container 20. Thus the liquid 25 displaces the gas inside container 20. The timer then terminates the supply of liquid 25 and causes the mould members 6a,6b to move apart and a pair of gripper plates 26a,26b (see FIG. 5) to engage with the container neck immediately below plates 4a,4b. Plates 4a,4b are then retracted (see FIG. 6) and the container transported, by means of gripper plates 26a,26b to a conventional capping station (not shown).

Since the liquid rapidly cools the inflated parison forming the container 20, the latter becomes form stable upon retraction of the heated mould members 6a,6b.

An example of another embodiment is as follows:

A 33 cl bottle was blow moulded from polyethylene terephthalate of inherent viscosity 0.71 (as measured at 25° C on a 1% solution of the polymer in o-chlorophenol) by mounting an injection moulded preform on a preheated mandrel, heating the preform to about 100° C, clamping the mandrel and neck of the platform inside a split bottle mould heated to 140° C, stretching the preform axially by means of a plunger and radially by means of nitrogen gas at a pressure of 10 atmospheres so as to orient it. The mould was maintained at 140° C for 25 seconds after application of the gas pressure, during which time the polyethylene terephthalate crystallised and became heat set. While maintaining the pressure, the mould was then cooled to 40° C. The gas pressure was released and the bottle removed from the mould.

The resultant bottles, which had a cylindrical portion of average wall thickness 0.43 mm corresponding to an area stretch ratio of 3.6:1 were immersed in boiling water for 5 minutes. The bottles exhibited a radial shrinkage of 0.17% corresponding to a volume change of about 0.425%.

The creep of a bottle filled with cola under pressure over a period of time was similar to that of a bottle made under similar conditions but using a mould maintained at about 30° C throughout the blow moulding cycle.

However the bottle made with the mould maintained at about 30° C throughout the moulding cycle distorted badly on immersion in boiling water.

I claim:

1. A process for the production of a heat set biaxially oriented polyethylene terephthalate bottle filled with a liquid comprising
   i. providing a polyethylene terephthalate parison having one closed end, preheated to a temperature at which it can be oriented, supported on a mandrel,
   ii. gripping the parison at its open end in a split mould the walls of which are heated to a temperature in the range 130° to 220° C,
   iii. stretching the parison axially by means of a plunger located in the mandrel and expanding the parison radially to contact the mould walls by means of a gas under pressure whereby the parison is transformed into a biaxially oriented bottle conforming to the mould configuration,
   iv. maintaining the bottle in contact with the walls of the mould by means of said gas under pressure while said polyethylene terephthalate crystallises,
   v. cooling the crystallised bottle by displacing the pressurising gas, while maintaining the pressure, with a cooling liquid,
   vi. removing the bottle containing the liquid from the mould.

2. A process as claimed in claim 1 in which the cooling liquid is the liquid to be packaged in the container.

3. A process as claimed in claim 1 in which the cooling liquid is chilled to 0° to 5° C prior to displacing the gas from the container.

4. A process as claimed in claim 1 in which the mould is maintained at 135° to 210° C.

* * * * *